Dec. 18, 1945.   R. R. RANEY   2,391,348
PICK-UP CONSTRUCTION
Original Filed Dec. 1, 1938   4 Sheets-Sheet 3
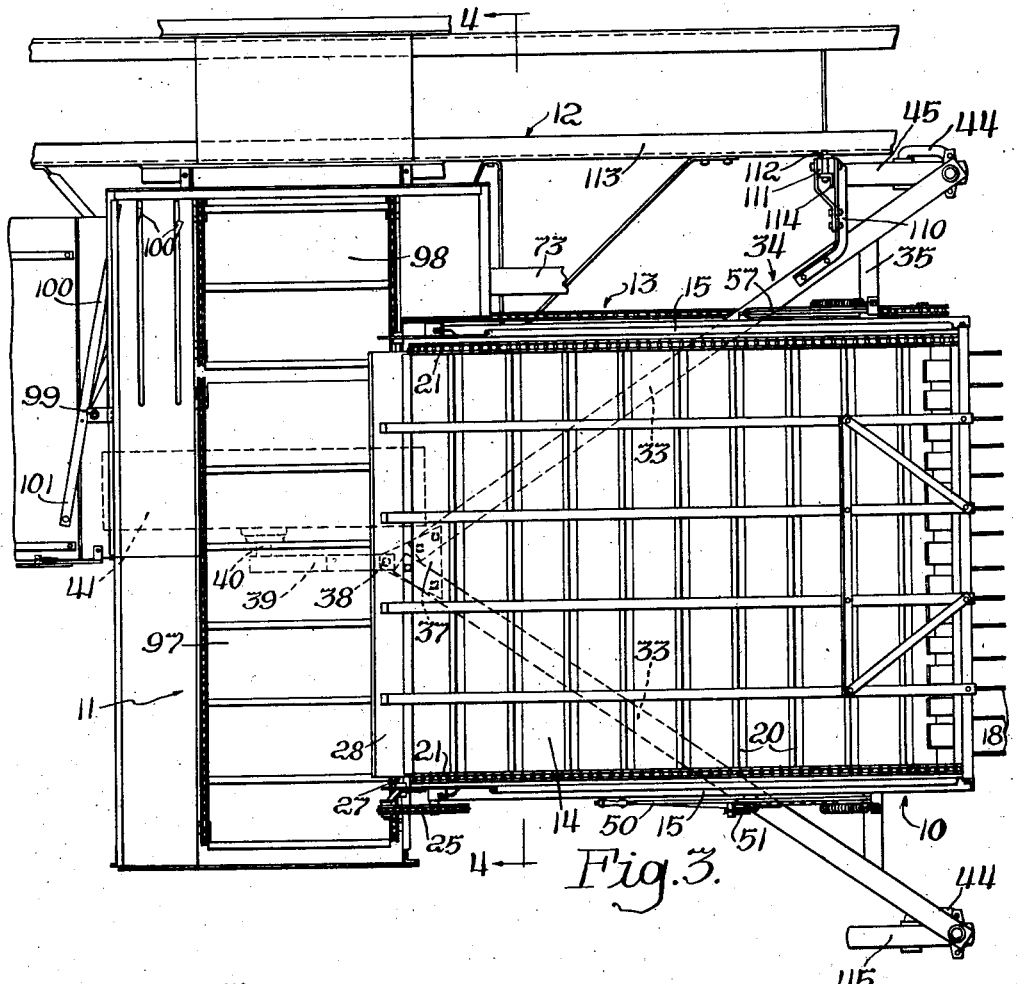
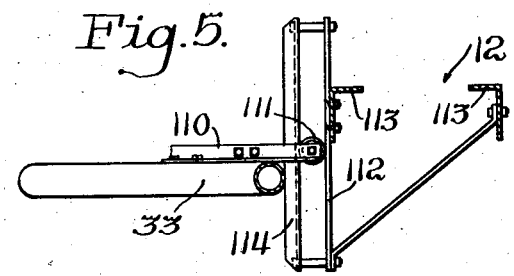
Inventor
Russell R. Raney.
By Paul O. Pippel
Att'y.

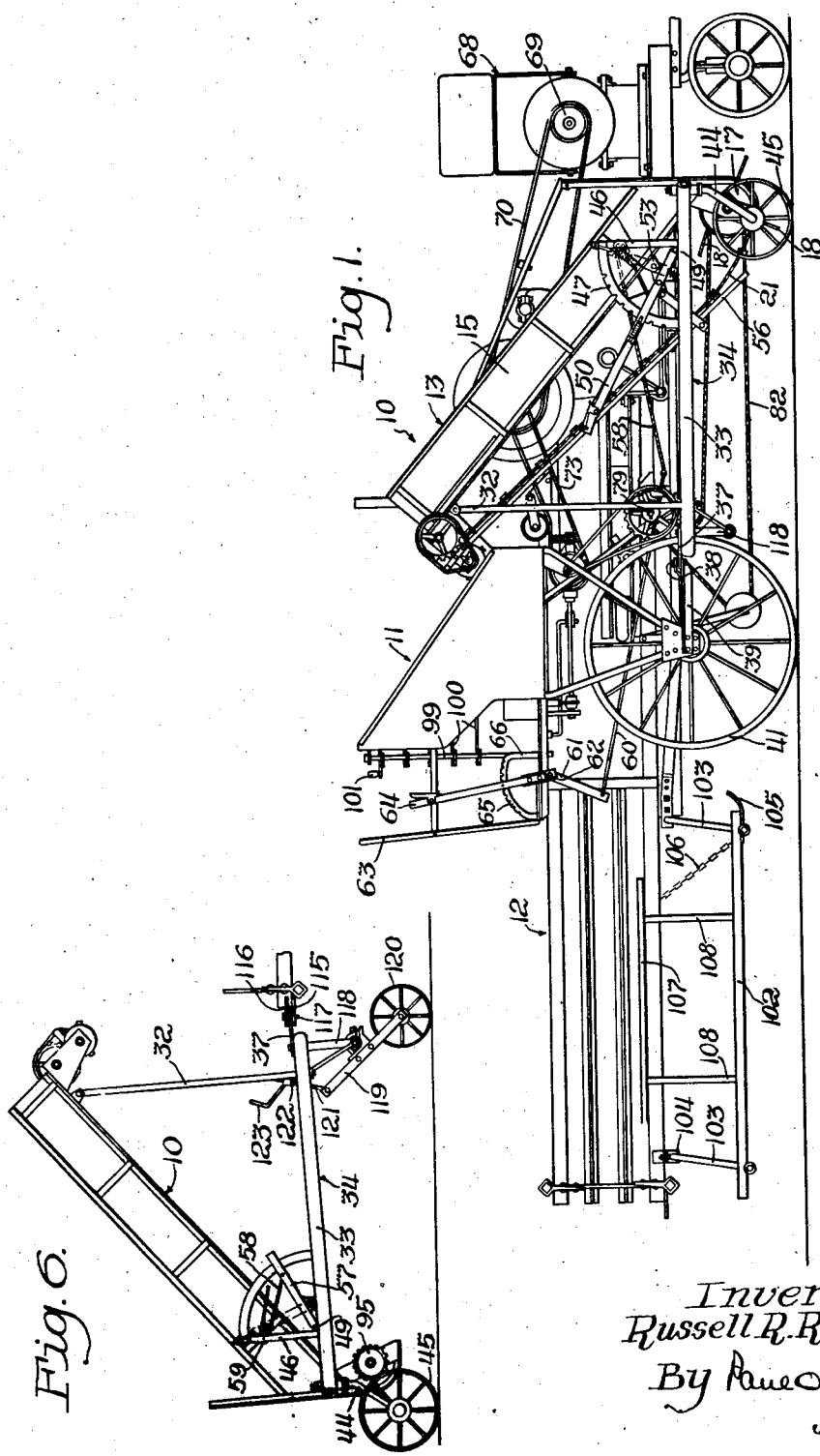

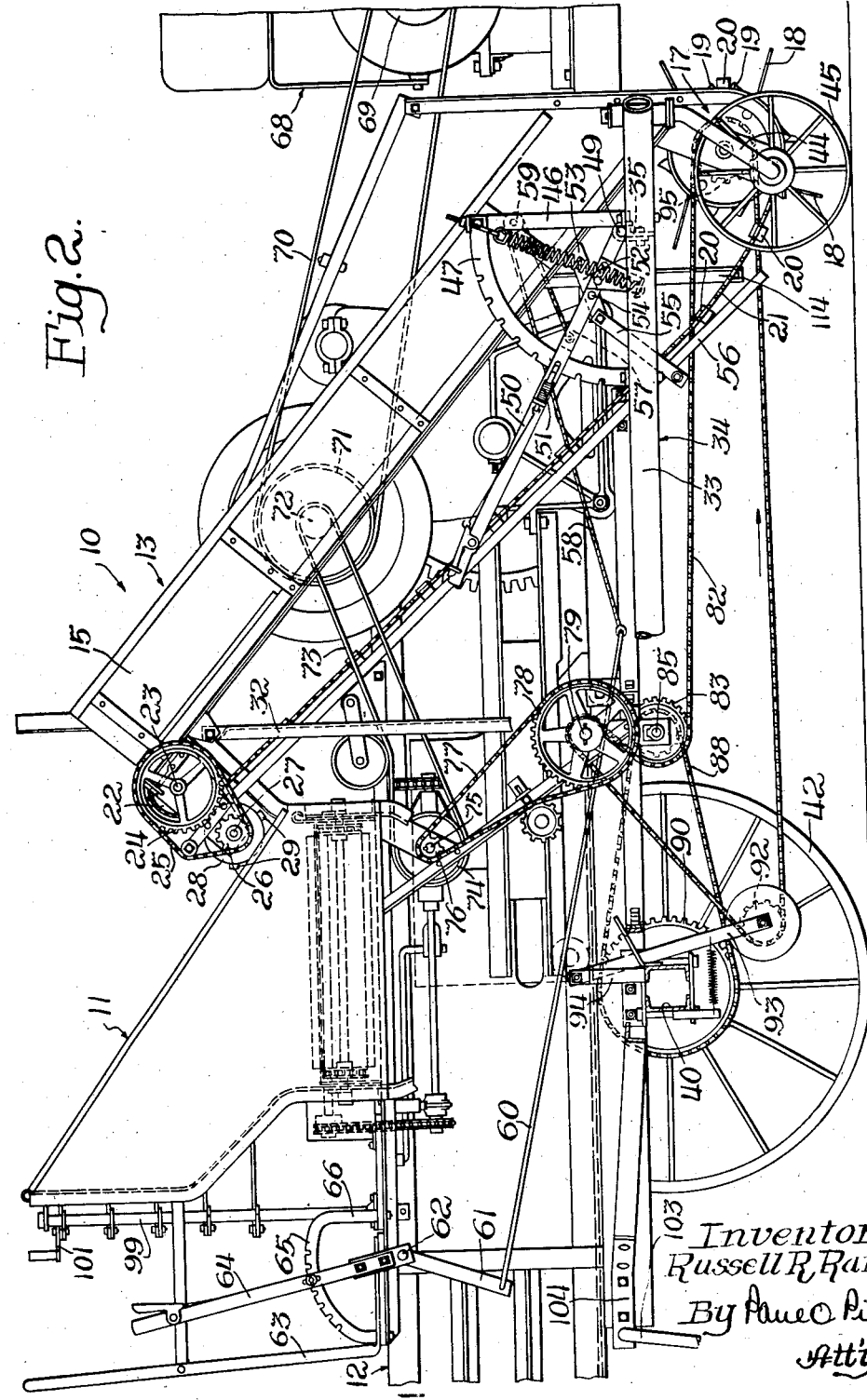

Dec. 18, 1945.  R. R. RANEY  2,391,348
PICK-UP CONSTRUCTION
Original Filed Dec. 1, 1938  4 Sheets-Sheet 4

Inventor
Russell R. Raney
By Paul O. Rippel
Att'y.

Patented Dec. 18, 1945

2,391,348

UNITED STATES PATENT OFFICE 2,391,348

PICKUP CONSTRUCTION

Russell R. Raney, Auburn, N. Y., assignor to International Harvester Company, a corporation of New Jersey Original application December 1, 1938, Serial No. 243,412. Divided and this application July 30, 1941, Serial No. 404,644

18 Claims. (Cl. 56—364)

This application is a division of application Serial No. 243,412, filed December 1, 1938.

The supporting of a pick-up unit as part of a traveling pick-up baler presents a considerable problem. It is desirable that the pick-up unit be connected in such a way that it is easily propelled in normal operating position and that it be capable of easy detachment and be relatively stable when detached from the baler for transport.

An object of the invention is to provide a novel frame structure for supporting a pick-up unit of a pick-up baler.

Another object is the provision of a frame structure for a pick-up unit which permits easy detachment of the unit and convenient transport of the same.

Other objects will appear from the disclosure.

The pick-up baler of the present invention comprises a baler unit, a pick-up unit, and a conveying mechanism therebetween. The pick-up unit is supported on a triangular or A frame connected to the main axle with provision for adjustment of the unit with respect to the frame at the end away from the axle.

In the drawings:

Figure 1 shows the pick-up baler in side elevation;

Figure 2 is a side elevation partly in section, on an enlarged scale, of a portion of the pick-up baler with certain parts omitted;

Figure 3 is a plan view of the parts of Figure 2;

Figure 5 is a detail view showing a slidable connection between the pick-up unit and the baler unit; and, Figure 6 shows the pick-up unit in transport position.

Figure 4:
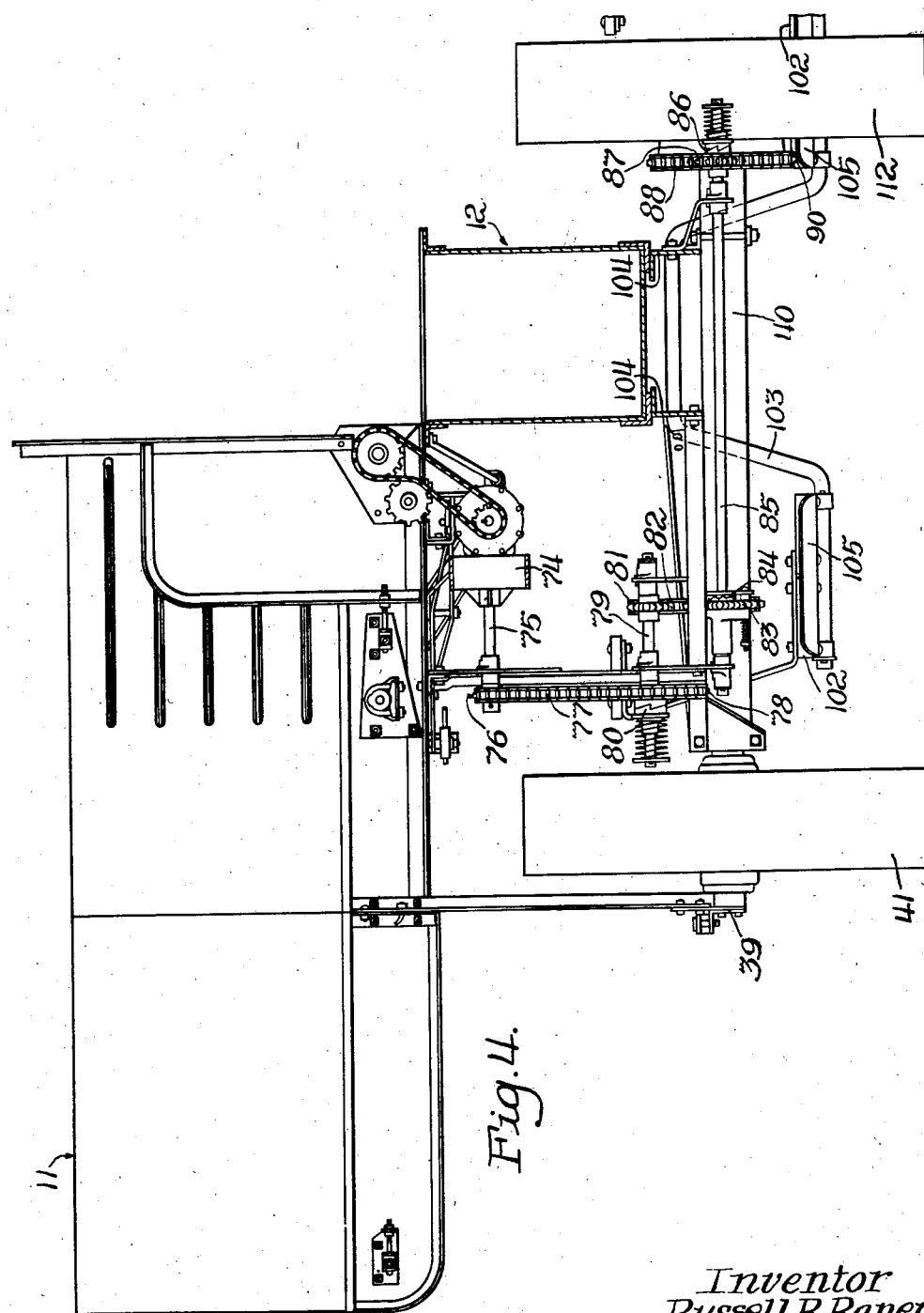
Figure 4 is a sectional view taken along the lines 4—4 of Figure 3.

The pick-up baler of the present invention comprises a pick-up unit 10, a conveyer mechanism 11, and baler unit 12. The pick-up unit includes a body 13 having a floor 14 and sides 15. At the lower end of the body 13 is a cylinder 17 having tines 18 thereon and lugs 19, between which fit slats 20, which move upwardly over the floor 14 of the body. The ends of the slats are attached to chains 21 at opposite sides of the body 13. One of these chains drives a sprocket 22, which in turn drives a shaft 23 to which is secured a sprocket 24. The sprocket 24 drives a chain 25 which in turn drives a sprocket 26 secured to the end shaft 27 on which a roll 28 is mounted, having lugs 29.

The upper end of the body 13 is pivoted on an upright U-shaped member 32, which is secured to legs 33 of a triangular or A frame 34 having a transverse connecting piece 35. The converging ends of the legs 33 are secured to a plate 37, pivotally secured in turn by a pin 38 to a bracket 39 attached to the end of an axle 40. This axle extends the entire width of the pick-up baler and is supported at one end on a wheel 41, and at the other end on a wheel 42. The front end of the triangular frame is supported on axles 44 and caster wheels 45. As shown in Figure 2, there is mounted upon the transverse member 35 an upright piece 46. An arcuate tooth member 47 is secured to the member 46 and to the one side piece 33 of the A-frame. A rock-shaft 49 is rotatably secured to the transverse member 35 and has secured thereto a lever 50 having detent mechanism 51 thereon adapted to engage the arcuate tooth member 47. A link 52 is pivotally secured to the under side of the body 13 by means of a lug member 53 and is also pivotally secured to the lever 50 at 54. A bail member 55 is also pivotally secured to the link 52 and supports an apron 56 adapted to support the slats 20 beneath the body 13. The apron 56 is thus adjusted automatically during raising or lowering of the pick-up body.

The mechanism just described is at the lower side of the pick-up unit, as viewed in Figure 3. A similar mechanism is located at the other side. However, in this case, there is a short arm 57 secured to the rock-shaft 49 in parallel relation to the lever 50. A flexible member 58 is connected to this arm 57 and extends around a sheave 59 to a connection with a rod 60 secured in turn to an arm 61 pivotally secured at 62 to the under side of an operator's platform 63. A lever 64, having detent mechanism thereon, is also pivotally mounted at 62 so as to swing with the arm 61, and is adapted to be locked to an arcuate tooth portion 65 of a bent member 66 secured to the operator's platform 63. By means of the mechanism just described, the position of the lower end of the body 13 may be regulated. By the lowering of the lever 50, the lower or forward end of the body 13 is lowered. A raising of the lever effects a raising of this same end of the body. With the detent mechanism 51 held out of engagement with the arcuate tooth member 47, as shown in Figure 2, control of the lower end of the body 13 is had through the lever 64.

A power unit 68 is mounted at the front of the pick-up baler and drives, by means of a pulley 69, a belt 70 which in turn drives a pulley 71. The pulley 71 is coaxially mounted with a pulley 72 driving the same, and this pulley 72 drives a belt 73, in turn driving a pulley 74. The pulley 74 is mounted on a shaft 75 which it drives. Also mounted on this shaft is a sprocket 76 driven by the shaft 75, and the sprocket 76 in turn drives a chain 77. The chain 77 drives a sprocket 78 mounted upon a shaft 79 and arranged to drive the same through an overrunning clutch 80. A sprocket 81 is mounted on the shaft 79 and driven by it, and drives in turn a chain 82. The chain 82 drives a sprocket 83 secured to a slip clutch 84 mounted upon one end of a shaft 85. At the other end of the shaft 85 is an overrunning clutch 86 connected with a sprocket 87 having a chain 88 in meshing engagement therewith. The chain 88 also engages a sprocket 90 driven by the wheel 42. The chain 82, which is in engagement with the sprockets 81 and 83, is also in engagement with a tightener sprocket 92 supported upon an arm 93 pivotally attached to a piece 94 connected to the axle 40, as shown in Figure 2. It is also in mesh with a sprocket 95 driving the roll 17 and conveyer composed of slots 20 and chains 21.

It will be seen that with the above described arrangement there is interdependent ground and power drive of the pick-up unit. The power unit 68, acting through the pulley 78 and the overrunning clutch 80, drives the chain 82 which in turn drives the sprocket 95, the cylinder 17, and the chains 21 supporting the slats 29. The power unit is run at a constant speed, and so the speed of the pick-up unit is also constant. When, however, the speed of the pick-up baler over the ground exceeds a certain amount, the wheel 42, acting through the sprocket 87 and the overrunning clutch 86, drives the shaft 85, sprocket 83, and chain 82 faster than it would otherwise be driven by means of the power unit 68. Accordingly, there is an overrunning of the clutch 80. The chain 82 is driven faster and in proportion with the speed of the wheel 42. Consequently, the pick-up unit, i. e., the speed of the slats 21 over the floor 15 of the body 13, is also increased and is kept in proportion with the speed of the wheel 42 or with the speed of the pick-up baler over the ground. If, now, the speed of the pick-up baler over the ground is so slow that the wheel 42 cannot drive the chain 82 as fast as the power unit 68 drives it, then the power unit drives this chain at the predetermined minimum speed and there is an overrunning of the clutch 86. From this it will be seen that the speed of the pick-up unit is proportional to the speed of the pick-up baler over the ground down to a predetermined speed of the pick-up baler, below which the speed of the pick-up unit is held constant.

The conveying mechanism between the pick-up unit and the baler unit will be described only briefly since it forms no part of the present invention, but is described in detail and claimed in the co-pending application of Clemma R. Raney, filed October 8, 1938, Serial No. 233,998. Briefly, the conveyer mechanism 11, as shown in Figure 3, comprises a long conveyer 97 adjacent the pick-up unit and a short conveyer 98 adjacent the baler unit 12. Rearwardly of the two conveyers 97 and 98 is a vertical shaft 99, to which is secured a plurality of fingers 100 and a handle 101. The arrangement is such that, when it is desired to set a block in the baling chamber 12, the handle 101 is swung clockwise, as viewed in Figure 3, to bring the fingers 100 into a position between the conveyers 97 and 98 and to cause a stopping of the conveyer 97. Thus, no material is fed from the conveyer 97 to the conveyer 98, and the conveyer 98 quickly clears itself, thus effecting a clear separation of the stream of hay going into the baler unit 12. This is a requisite for the proper setting of the block at the baler unit.

Secured at the rear of the baling unit 12 and hung underneath it at both sides is a pair of platforms 102. These platforms are supported by a pair of generally U-shaped members 103 secured in bracket members 104 at the underside of the baler unit 12. At the end of each platform 102 toward the pick-up unit is a bent nose member 105. A pair of chains 106 connects the platforms and the baler unit 12. There is a seat 107 supported over each platform by means of connecting members 108. A wire tier may stand on either one of the platforms 102 when the pick-up baler is in operation and moving over a field. If the wheels 41 and 42 go into a depression in the ground, the nose members 105 will strike the ground and allow the platforms 102 to swing rearwardly and upwardly. Thus, there will be no damage to these platforms. The chain 106 limits the forward movement of these platform structures.

Figure 5 shows an arrangement of parts by which the A-frame 34, supporting the pick-up unit, is prevented from swinging away from the baler unit 12. The member 110 is secured to one of the pieces 33 of the A-frame and has at one end a roller 111 which fits between a part 112 bolted to angle members 113 forming a part of the frame of the baler unit 12, and an angle member 114 secured in spaced relation to the member 112. The roller 111 is adapted to ride in the space between the members 112 and 114, and thus the A-frame is kept in fixed relation with respect to the baler 12, regardless of how the A-frame may pivot up or down. The arc on which the A-frame 34 swings about the axis of the axle 40 is so small that there is not much deviation from a straight line movement. Furthermore, the parts 112 and 114 do not confine the roller 111 in a direction toward or away from the axle 40, and consequently there is provision for the relative movement of the roller 111 with respect to the parts 112 and 114 which is not strictly in a straight line.

By virtue of the sliding connection of the roller 111 in the slide formed by the members 112 and 114 and a loose connection of the pick-up unit to the axle 40 in the pin 38 connecting the plate 37 and the bracket 39, the pick-up unit and supporting frame have a vertical movement about the pin 38. The pick-up unit and frame may also pivot about a diagonal axis determined by the pin 38 and the roller 111 and slide members 112 and 114, when outer wheel 45 encounters an unevenness in the ground. This diagonal axis is generally parallel to the inner frame member 33.

Figure 6 shows the pick-up unit 10 in transport position. The unit has been detached from the bracket 38 and is attached between two spaced pieces 115 and 116 at the rear of the baler unit by means of a bolt 117 and the piece 37 secured to the A-frame 34. A U-shaped member 118 extends downwardly from the A-frame 34, and on a shaft extending between the legs of the U-shaped member is pivoted a member 119 having at one end a wheel 120. At the other end of the member 118 is secured a threaded bolt 121 which extends through a bracket member 122 secured to the A-frame 34. A crank 123 is threaded onto the bolt and by means of this the angular position of the member 119 is adjusted and, consequently, the height of the A-frame. Thus, the A-frame may be raised into a position where it may be attached to the members 115 and 116 at the rear of the baler unit 12.

It will be seen from the foregoing description that a novel arrangement has been devised for holding the supporting frame of the pick-up unit of a pick-up baler in fixed spaced relation with respect to the baler unit. The pick-up unit is supported on a triangular frame connected to the main axle with provision for adjustment of the unit with respect to the triangular frame at the end away from the axle. Means for effecting this adjustment may be controlled either immediately adjacent this end or from an operator's station adjacent the cross-conveyer. The triangular frame constitutes the entire support for the pick-up unit. The pick-up unit and frame have vertical movement about the pin connecting the frame to the axle. A roller-and-slide connection between the frame and baler unit prevents lateral movement between the two frames.

The intention is to limit the invention only within the terms of the appended claims.

What is claimed is:

1. In combination, a first frame, ground-engaging means therefor, a second frame of triangular shape, means connecting one corner of the second frame to the first frame for support and for vertical pivotal and sliding movement with respect thereto, ground-engaging means supporting the side of the second frame opposite the said one corner, a pick-up unit positioned over the second frame, and means entirely supporting the pick-up unit on the second frame.

2. In combination, a longitudinal frame, ground-engaging means therefor, means extending transversely from the side of the longitudinal frame, a triangular frame positioned alongside the longitudinal frame, means connecting one corner of the triangular frame to the transversely extending means for support and for vertical sliding movement, ground-engaging means supporting the side of the triangular frame opposite the said one corner, a pick-up unit positioned over the triangular frame, and means entirely supporting the pick-up unit on the triangular frame.

3. In combination, a first frame, ground-engaging means therefor, a second frame of triangular shape, means connecting one corner of the second frame to the first frame, means connecting another corner of the second frame to the first frame, ground-engaging means connected to the second frame for supporting the same at a portion spaced from the corners connected to the first frame, a pick-up unit positioned over the second frame, and means entirely supporting the pick-up unit on the second frame.

4. In combination, a mobile frame having an axle and wheels therefor, a triangular frame, means connecting one corner of the triangular frame to the axle immediately outside one wheel, supporting wheels, means connecting the supporting wheels to the other corners of the triangular frame, an inclined pick-up unit positioned over the triangular frame, means pivotally supporting the upper end of the pick-up unit over and on the said one corner of the triangular frame, and means adjustably supporting the lower end of the pick-up unit on the triangular frame adjacent the said other corners.

5. In combination, a mobile frame having an axle and wheels therefor, a triangular frame, means connecting one corner of the triangular frame to the axle, supporting wheels, means connecting the other corners of the triangular frame to the supporting wheels, an inclined pick-up unit, means extending upwardly from the triangular frame adjacent the one corner thereof and pivotally supporting the upper end of the pick-up unit well above the triangular frame, and means connecting the lower end of the pick-up unit to the triangular frame adjacent the said other corners thereof.

6. In combination, a first frame having an axle and wheels therefor, a cross conveyer, means mounting the cross conveyer on the first frame, a second frame of triangular shape, means connecting one corner of the second frame to the first frame for support of the said one corner, ground-engaging means supporting the side of the second frame opposite the one corner, a pick-up unit positioned over the second frame, a U-shaped member secured to the second frame adjacent the said one corner thereof and extending upwardly therefrom, means pivotally supporting the upper end of the pick-up unit on the upper ends of the U-shaped member adjacent the cross conveyer, and means adjustably supporting the lower end of the pick-up unit on the side of the second frame opposite the said one corner thereof.

7. In combination, a mobile frame including a transverse wheeled axle extending at one side of the frame, a second frame including a generally horizontal triangular structure having one apex disposed adjacent a point on the axle spaced transversely of the first frame and another apex closely adjacent one side of the frame and longitudinally spaced from the axle, means pivotally connecting said apex to the axle at said point, and means pivotally connecting the first and second frames at the apex closely adjacent the first frame, said means providing a pivot axis extending diagonally as respects the axle of the first frame, a pick-up unit positioned over the second frame, and means entirely supporting the pick-up unit on the second frame.

8. In combination, a longitudinal frame including ground-engaging means, a second frame alongside the first frame and including a side frame member in proximity to and diagonally disposed as respects one side of the first frame, a pick-up unit carried by the second frame, and means longitudinally spaced apart on the first frame and pivotally connected to the frame member of the second frame to provide a pivot axis between the frames generally paralleling said frame member.

9. In a pick-up baler, the combination of a longitudinal frame including a transverse axle, a second frame alongside the first frame, a pick-up unit, means supporting said unit on the second frame, a pair of longitudinally and transversely spaced means pivotally interconnecting said frames for relative movement and including a pivotal connection between the second frame and the axle of the first frame to provide a pivot axis diagonal of the frames, and a pair of caster wheels supporting the second frames.

10. In a pick-up baler, the combination of a longitudinal frame including ground-engaging means, a second frame alongside the first frame and including ground-engaging means, a pick-up unit, means carrying the unit wholly on the second frame, and a pair of means spaced longitudinally and transversely apart and pivotally interconnecting the frames for relative movement generally about an axis diagonally of the frames.

11. In combination, a longitudinal frame having a transverse wheeled axle, a portion of the axle extending at one side of the frame, a triangular frame arranged adjacent the first frame and having one side of the triangle extending diagonally as respects the first frame and one apex of the triangle adjacent the aforesaid axle portion, and means pivotally interconnecting the frames on a pivot axis generally paralleling the aforesaid side of the second frame and including a connection between the axle portion and the aforesaid apex of the second frame.

12. In combination, a longitudinal frame having ground-engaging means and a transverse support extending at one side of the frame, a triangular frame arranged adjacent the first frame and having one side of the triangle extending diagonally as respects the first frame and one apex of the triangle adjacent the aforesaid support, means pivotally interconnecting the frames on a pivot axis generally paralleling the aforesaid side of the second frame and including a connection between the support and the aforesaid apex of the second frame, and ground-engaging means supporting a portion of the second frame at a point spaced from the aforesaid connection between the support and apex of the second frame.

13. In combination, a longitudinal frame including ground-engaging means, a support carried by said frame and extending transversely at one side thereof, a second frame alongside the first frame and comprising generally a triangular structure having one apex disposed closely adjacent the support, ground-engaging means carrying the second frame at a point spaced from the aforesaid apex, means between said apex of the second frame and the support and effecting a movable connection between the frames for relative vertical movement of the frames as the ground-engaging means of each frame encounters varying ground contour, a pick-up unit disposed over the second frame, and means supporting said unit wholly on said second frame.

14. In combination, a longitudinal frame including ground-engaging means, a support carried by said frame and extending transversely at one side thereof, a conveyor extending transversely of the frame, means supporting the conveyor on the support, a second frame alongside the first frame and comprising generally a triangular structure having one apex disposed closely adjacent the support, ground-engaging means carrying the second frame at a point spaced from the aforesaid apex, means between said apex of the second frame and the support and effecting a movable connection between the frames for relative vertical movement of the frames as the ground-engaging means of each frame encounters varying ground contour, a pick-up unit disposed over the second frame and having a portion adjacent the conveyor, and means supporting said unit wholly on said second frame independently of the conveyor and the first frame.

15. In combination, a longitudinal wheeled frame, a support carried by and extending transversely at one side of the frame, a triangular frame alongside the first frame and having one corner disposed toward the support, a movable connection between said corner and the support including a member extending from said corner toward and connected to the support, another corner of the second frame being adjacent the first frame, ground-engaging means supporting the second frame, and means effecting a vertically slidable connection between the frames and disposed at the corner of the second frame adjacent the first frame.

16. In combination, a longitudinal wheeled frame, a support at one side of the frame, means including a vertically disposed guide element carried at the same side of the frame and spaced longitudinally from the support, a second frame alongside the first frame, a pick-up unit carried by the second frame, means pivotally connecting one portion of the second frame to the support, and means connecting another portion of the second frame to the guide element, the frames thereby having relative vertical movement about the connecting means on the support and guided by the guide element.

17. In combination, a mobile crop-treating unit, a mobile pick-up device positioned alongside of the crop-treating unit and including an elevating conveyer extending to the level of the top of the unit and ground-engaging supporting means, a horizontal means extending transversely of the unit at the level of the top thereof from the top of the elevating conveyer to the top of the unit, over which means crops are forwarded from the elevating conveyer to the crop-treating unit, means mounting the last-mentioned means on the crop-treating unit, means coupling the pick-up device to the crop-treating unit at points spaced from the forwarding means for enabling the pick-up device to be driven alongside the crop-treating unit and for cooperating with the ground-engaging supporting means of the pick-up device to support the pick-up device entirely independently of the forwarding means.

18. In combination, a mobile baling unit having a feed opening in the top thereof, a mobile pick-up device positioned alongside of the baling unit and including an elevating conveyer extending to the level of the top of the baling chamber and ground-engaging supporting means, a means extending transversely of the baling unit from the elevating conveyer to the feed opening in the baling unit, over which means crops are forwarded from the elevating conveyer to the baling unit, means mounting the forwarding means on the baling unit, means coupling the pick-up device to the baling unit at points spaced from the forwarding means for enabling the pick-up device to be drawn alongside the baling unit and for cooperating with the ground-engaging supporting means of the pick-up device to support the pick-up device entirely independenly of the forwarding means.

RUSSELL R. RANEY.